United States Patent [19]

Hoshi et al.

[11] 3,798,380

[45] Mar. 19, 1974

[54] TELEPHONE APPARATUS

[75] Inventors: Yoshimitu Hoshi, Tokyo; Takeshi Wakabayashi, Sagamihara; Saburo Uchida, Tokyo, all of Japan

[73] Assignee: Tamura Electric Works, Ltd., Tokyo, Japan

[22] Filed: May 6, 1971

[21] Appl. No.: 140,694

[30] Foreign Application Priority Data

May 9, 1970 Japan ............................... 45-39102

[52] U.S. Cl. ................................ 179/18 B, 179/6 R

[51] Int. Cl. ........................ H04m 3/42, H04m 1/64

[58] Field of Search .................................. 179/18 B

[56] References Cited

UNITED STATES PATENTS 3,600,517 8/1971 Goodman ............................ 179/5.5

*Primary Examiner*—William C. Cooper

*Attorney, Agent, or Firm*—Chittick, Thompson & Pfund

[57] ABSTRACT

In telephone apparatus there are provided a telephone set; terminal apparatus; means for receiving a push button dialing signal for selecting the telephone set; a response device having a recording tape containing a first information block in which the dial number of the called party, the dial number of the terminal apparatus and the information regarding thereto are recorded, and a second block in which a signal representing the absence of the called party is recorded; and a control device. The response device is operated by a received signal and returns to its original state when the information reproduced in the first block is transmitted to the calling party and thereafter the telephone set or the terminal apparatus is seized by the dialing signal.

7 Claims, 30 Drawing Figures

PATENTED MAR 19 1974 3,798,380

SHEET 01 OF 12

INVENTORS

YOSHIMITU HOSHI
TAKESHI WAKABAYASHI
SABURO UCHIDA

BY Chittick, Pfund, Birch, Samuels & Gauthier
ATTORNEYS

INVENTORS

YOSHIMITU HOSHI
TAKESHI WAKABAYASHI
SABURO UCHIDA

BY Chittick, Pfund, Birch, Samuels & Gauthier
ATTORNEYS

FIG. 5
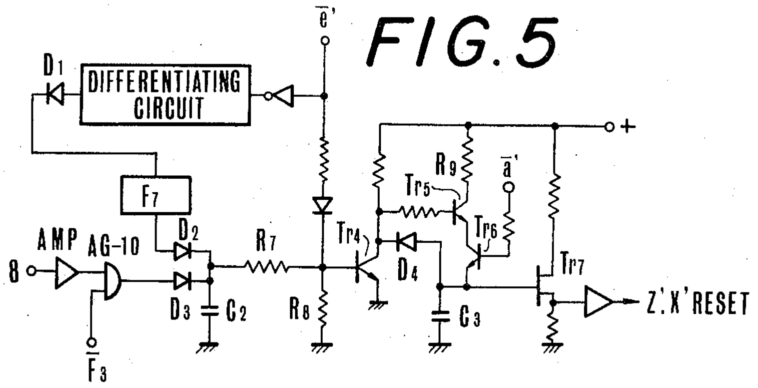
FIG. 7
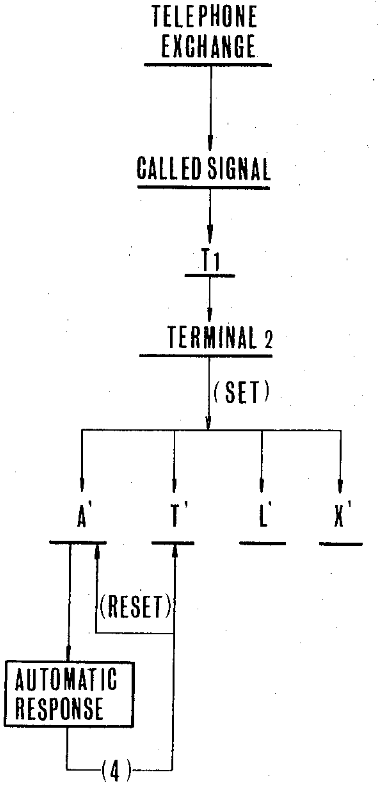
FIG. 6
| ē' | AG-10, F7 | ā' | RESET SIGNAL |
|---|---|---|---|
| 0 | 0 | 0 | 0 |
| | 1 | 0 | 0 |
| | 0 | 1 | 1 |
| | 1 | 1 | 0 |
INVENTORS
YOSHIMITU HOSHI
TAKESHI WAKABAYASHI
SABURO UCHIDA
BY Chittick, Pfund, Birch, Samuels & Gauthier
ATTORNEYS INVENTORS
YOSHIMITU HOSHI
TAKESHI WAKABAYASHI
SABURO UCHIDA
BY Chittick, Pfund, Birch, Samuels & Gauthier
ATTORNEYS INVENTORS
YOSHIMITU HOSHI
TAKESHI WAKABAYASHI
SABURO UCHIDA
BY Chittick, Pfund, Birch, Samuels & Gauthier
ATTORNEYS INVENTORS
YOSHIMITU HOSHI
TAKESHI WAKABAYASHI
SABURO UCHIDA
BY Chittick, Pfund, Birch, Samuels & Gauthier
ATTORNEYS

INVENTORS

YOSHIMITU HOSHI
TAKESHI WAKABAYASHI
SABURO UCHIDA

BY Chittick, Pfund, Birch, Samuels & Gauthier
ATTORNEYS

PATENTED MAR 19 1974 3,798,380

SHEET 08 OF 12

INVENTORS

YOSHIMITU HOSHI
TAKESHI WAKABAYASHI
SABURO UCHIDA

BY Chittick, Pfund, Birch, Samuels & Gauthier
ATTORNEYS

INVENTORS
YOSHIMITU HOSHI
TAKESHI WAKABAYASHI
SABURO UCHIDA
BY Chittick, Pfund, Birch, Samuels & Gauthier ATTORNEYS

INVENTORS

YOSHIMITU HOSHI
TAKESHI WAKABAYASHI
SABURO UCHIDA

BY Chittick, Pfund, Birch, Samuels & Gauthier
ATTORNEYS

INVENTORS
YOSHIMITU HOSHI
TAKESHI WAKABAYASHI
SABURO UCHIDA
BY Chittick, Pfund, Birch, Samuels & Gauthier
ATTORNEYS

INVENTORS

YOSHIMITU HOSHI
TAKESHI WAKABAYASHI
SABURO UCHIDA

BY Chittick, Pfund, Birch, Samuels & Gauthier
ATTORNEYS

TELEPHONE APPARATUS

BACKGROUND OF THE INVENTION

This invention relates to novel telephone apparatus and more particularly to telephone apparatus including a single telephone set and a plurality of terminal apparatus connected to the same telephone.

SUMMARY OF THE INVENTION

The objects of this invention can be summarized as following 14 objects.

The first object is to provide telephone apparatus capable of automatically replying to a signal received from an office.

The second object is to provide a novel telephone apparatus which uses a record of the subscribers number and name recorded at a first information block and sends out successively the numbers of a telephone set and terminal apparatus which are connected by the push button dialing of the calling subscriber.

The third object of this invention is to provide novel telephone apparatus, which when connected to the line in response to a push button dial signal, sends out a calling tone, or signal, sends out a ring back tone to the calling party, and when the telephone set is on-hook opens the subscriber's line after termination of the calling tone and the speech, and thereafter prepares for receiving the next signal in the same manner as in the ordinary mutual communication. When the called party responds, the telephone apparatus is returned to its original state without sending out to the line information indicating absence of the called party which is recorded in the response device as a second information block.

The fourth object is to provide telephone apparatus, which under the condition just described, if the calling tone is sent out for a period greater than a predetermined interval, interrupts the sending out of the calling tone, sends out absence information recorded as the second step in response to the calling tone, and thereafter returns to and stops at the initial state to thus immediately open the subscriber's line. The purpose of this arrangement is to give a distinct information to the calling party as to whether the called party is present or absent, and to prevent too long reservation of the line by automatically terminating the calling condition, thus increasing the efficiency of utilizing the line.

The fifth object is to provide novel telephone apparatus which returns to the original state without sending out the information recorded in the second block when the terminal apparatus is dialled by push buttons because such information are not necessary in this case.

The above described dialing by push buttons is made in order to selectively interconnect the telephone set and the terminal apparatus after the information recorded in the first block been sent out, so that those who know the dialed number may selectively dial even while the reproduced information which was recorded in the first block is being sent out.

Accordingly, the sixth object of this invention is to provide telephone apparatus, which when the selected number of a telephone set is dialed during the transmission of the information recorded in the first block, immediately responds to this signal to stop reproducion and transmission of the information and prepares to start transmitting the second block and which, when the telephone set responds, establishes the state described in the fourth object when no reply is obtained during a predetermined interval.

The seventh object of this invention is to provide telephone apparatus, which when a selected number of the terminal apparatus or the like is dialed under the state described in the sixth object, stops to send out the reproduced information, connects the terminal apparatus corresponding to the selected number and automatically returns the automatic response device to the original state without sending out to the line the reproduced information by means of a series of operations because the second step is also unnecessary.

It is necessary to improve the condition of the telephone apparatus when it is connected to the terminal apparatus by redialing with selection push buttons under the states described in the sixth and seventh objects. The following objects relate to such improvement.

More particularly, the eighth object of this invention is to provide telephone apparatus which, when selecting and connecting a telephone set (the sixth object described above), maintains the subscriber's line until the response restores the original state, even in the on-hook condition, and thereafter opens the line. The purpose of this operation is to prepare for the arrival of a succeeding signal which may be sent thus preventing the recorded inforamtion from being sent out on the way.

The ninth object of this invention is to provide a novel telephone apparatus, which also in the case of selecting terminal apparatus, maintains the subscriber's line until the response device restores to its original state, even in the case of hook-on and opens the subscriber's line after restoration.

The tenth object of this invention is to provide telephone apparatus, which when a number other than that recorded in the first recorded information block is inadvertently dialed by the selection push buttons, sends to the calling party for a predetermined interval a signal, such as a busy tone, as a signal informing that the dialed number is not a correct number, and concurrently therewith returns the response device to the original state without sending out the recorded information to the line. The purpose of this operation is to eliminate the feelings of uneasiness and doubt of the called party, because misdialing results in a no tone state.

The eleventh object of this invention is to provide telephone apparatus capable of sending a calling tone in the same manner as the conventional telephone set.

The twelfth object of this invention is to provide telephone apparatus, which when the novel telephone apparatus is connected as a called party and its terminal apparatus are in use, enables the user to hear a busy tone or to see some type of visible indication that tells him that the terminal apparatus is in use when the telephone set is on-hooked.

The thirteenth object of this invention is to provide telephone apparatus, which when the calling and called parties are talking with each other with their telephone sets and terminal apparatus, permits disconnection of the telephone set from the communication line after the terminal apparatus on the sides of both calling and called parties have been interconnected. The purpose of this operation is to prevent the data communication from being disturbed by noise from the transmitter of the telephone set and to automatically or manually disconnect the subscriber's line when the communication is over.

The fourteenth object of this invention is to provide telephone apparatus, which when a calling party starts to call the novel telephone apparatus but abandons such calling operation before the telephone set and terminal apparatus are selected, restores the response device after the elapse of a predetermined interval of time and opens the line for the purpose of reserving the line. It is to be understood that the response device utilized in the novel telephone apparatus does not operate to switch a key to connect the telephone set to a recording device or to record and subsequently reproduce the content of the speech of the calling party when the called party is absent, as in the case of a conventional caretaking telephone set. However, it is possible to use a well known caretaking telephone set as the terminal apparatus of the novel telephone apparatus.

According to this invention, there is provided telephone apparatus comprising a telephone set associated therewith; means for receiving a push button dial signal for selecting the telephone set; a response device having a recording tape containing a first information block in which the dial number of the called party, the dial number of the terminal apparatus and information regarding thereto are recorded, and a second block in which a signal representing the absence of the called party is recorded; and a control device, the response device being operated by a received signal and returning to the original state of the first block when the information reproduced in the first block is transmitted to the calling party and thereafter the telephone set or terminal apparatus is seized by the subsequent dialing signal.

BRIEF DESCRIPTION OF THE DRAWINGS

Further objects and advantages of the invention will become apparent from the following detailed description taken in conjunction with the accompanying drawings in which:

FIG. 5 shows a circuit diagram of one example of the supervisory device utilized in the circuit shown in FIG. 4;

FIG. 6 shows a table to explain the operation of the supervisory device;

FIG. 7 is a chart showing an automatic response to a signal sent from an office;

DESCRIPTION OF THE PREFERRED EMBODIMENT

Figure 3:
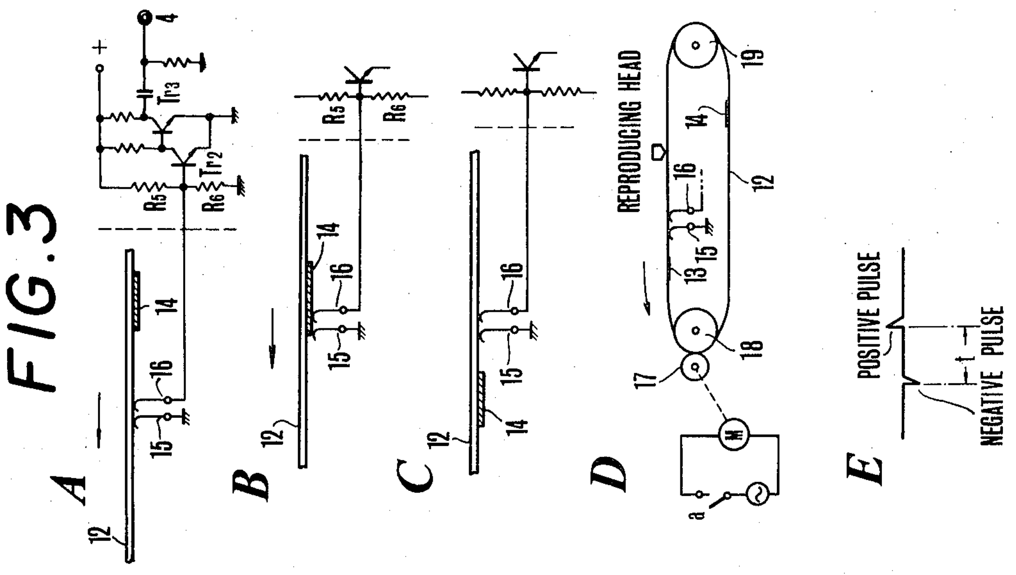
FIGS. 3A to 3E show a portion of the response device shown in FIG. 1 and its output.
Figures 1, 2:
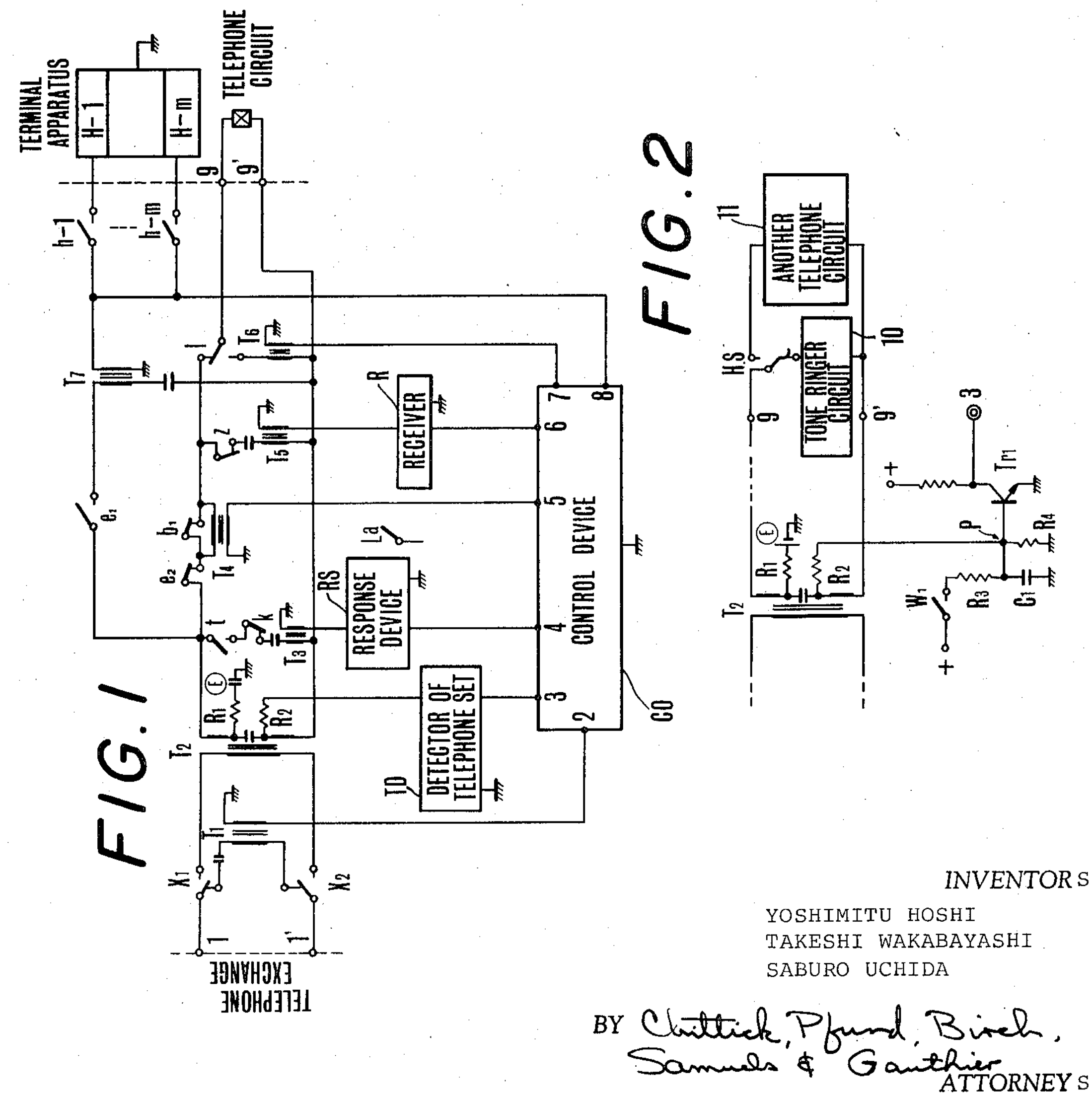
FIG. 1 shows a connection diagram of one example of the telephone apparatus embodying the invention.
FIG. 2 shows a connection diagram of a telephone set detector utilized in this invention.

Referring now to FIG. 1 of the accompanying drawing, terminals connected to a telephone exchange, not shown, are designated by numerals 1 and 1'. $x_1$, $x_2$ and $l$ represent transfer contacts belonging to relays $X$ and $L$ respectively. $t$, $a$, $e_1$, $h_{-1}$ . . . $h_{-m}$ represent make contacts whereas $k$, $e_2$, $b_1$, and $z$ break contacts belonging to relays T, $A$, $E$, $H_{-1}$ . . . $H_{-m}$; K, $B$ and $Z$, respectively. $T_1$, $T_2$, $T_3$, $T_4$, $T_5$, $T_6$ and $T_7$ represent transformers, respectively, $R_1$ and $R_2$ resistors, Ⓔ source, numerals 2, 3, 4, 5, 6, 7 and 8 terminals of a control device CO connected to various elements, and 9 and 9' represent line terminals of a telephone set.

FIG. 2 shows a connection diagram of the telephone set detector TD shown in FIG. 1 wherein symbols $T_2$, $R_1$, $R_2$ and 9, 9', 3 and Ⓔ show the same element as those shown in FIG. 1. In addition to these elements, the circuit shown in FIG. 2 further includes resistors $R_3$ and $R_4$, contact $w_1$ of a relay $w$, a capacitor $c_1$, a transistor $Tr_1$, a tone ringer circuit 10, telephone circuits 11 other than that illustrated and sources designated by symbols +.

FIGS. 3A to FIG. 3D show the responsive device RS of FIG. 1 wherein a numeral 12 represents 12 represents a reproduceable endless tape recorded with information, to which foils of electric conductor 13 and 14 are bonded and sliding contacts 15 and 16 are engaging. The tape is driven in the direction of arrows around guide rollers 18 and 19 by means of a driving roller 17 driven by an electric motor M. The output stage comprises resistors $R_5$ and $R_6$ and transistors $Tr_2$ and $Tr_3$. FIG. 3E shows a relationship between an output waveform from terminal 4 and the tape as it moves in the manner and direction illustrated by FIGS. 3A, 3B and 3C.

Figure 4:
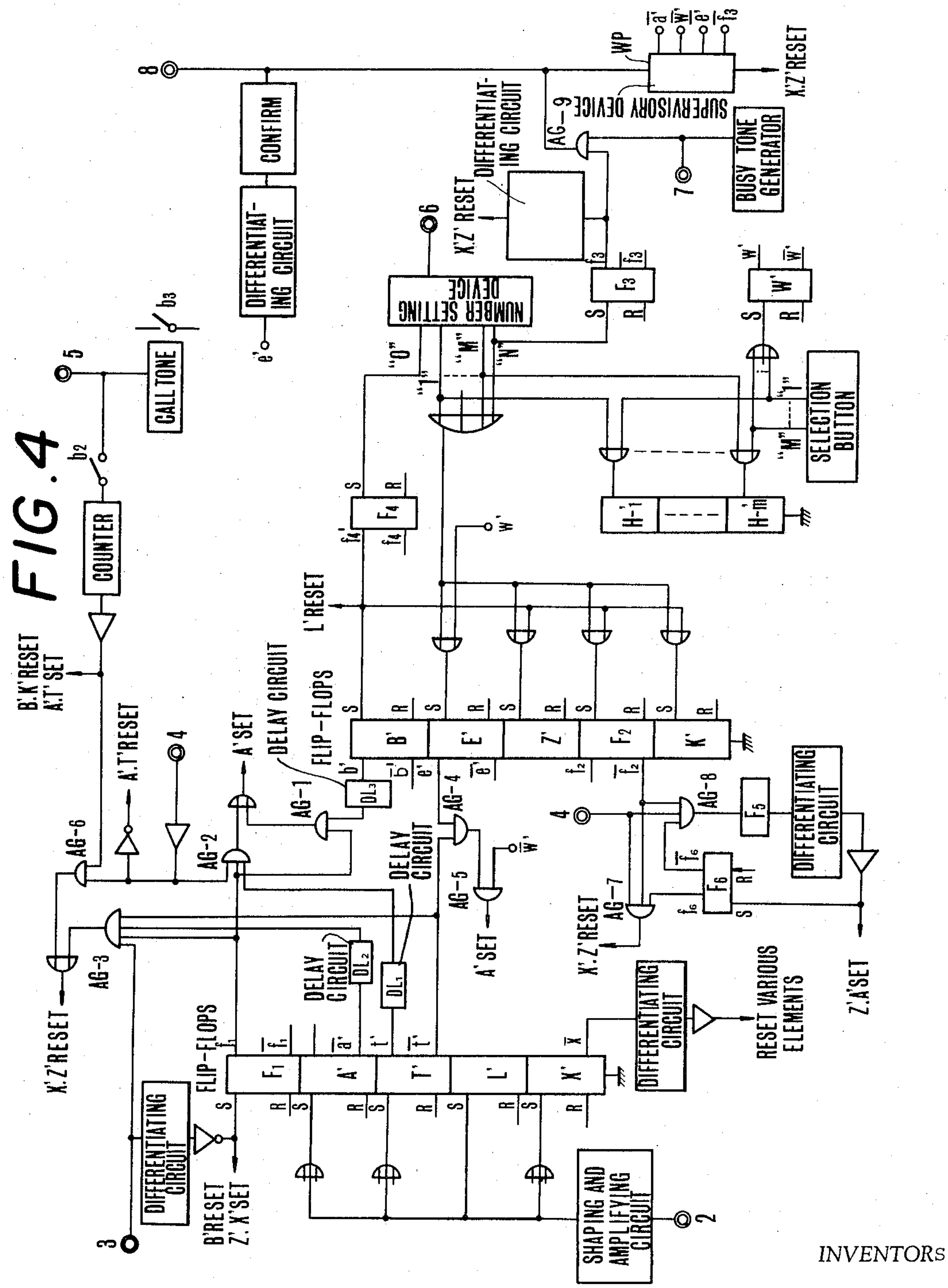
FIG. 4 is a connection diagram of a logic circuit comprising the control device shown in FIG. 1.

The logic circuit shown in FIG. 4 represents the control device CO of FIG. 1 and comprises flip-flop circuits $F_1$, A', T', L', X', B', E', Z', $F_2$, K', $f_3$, $F_4$, $F_6$, $H'_{-1}$, . . . $H'_{-m}$ and W'. Although not shown in FIG. 1, whenever one of the flip-flop circuits is set, corresponding respective relays A, T, L, X, B, E, Z, K, $H_{-1}$ . . . $H_{-m}$ (corresponding to the contacts shown in FIG. 1) operate, whereas when each flip-flop circuit is reset, the relays corresponding to this particular flip-flop is also reset. With particular reference to flip-flop circuit B', a letter S represents a set input, R a reset input and b' an output terminal which provides an output 1 when set. Under these conditions terminal b'provides an output 0 but provides an output 1 when reset. At this time, $t$, terminal $\bar{b}'$ provides an output 0. The other flip-flop circuits are constructed similarly; $b_2$ and $b_3$ represent make contacts of relay B'', $AG_{-1}$ $AG_{-2}$, $AG_{-3}$, $AG_{-4}$, $AG_{-5}$, $AG_{-6}$, $AG_{-7}$, $AG_{-8}$ and $AG_{-9}$ represent AND gate circuits, and $DL_1$, $DL_2$ and $DL_3$ represent delay circuits. Numerals 2, 3, 4, 5, 6, 7 and 8 represents the terminal numbers described above.

FIG. 5 shows the details of the supervisory device WP shown in FIG. 4 which comprises resistors $R_7$, $R_8$ and $R_9$, diodes $D_1$, $D_2$, $D_3$ and $D_4$, capacitors $C_2$ and $C_3$, transistors $Tr_4$, $Tr_5$ and $Tr_6$, a uni-junction type transistor $Tr_7$, an one shot multivibrator $F_7$, and an AND gate circuit $AG_{-10}$. The circuit has terminal 8 described above, and $\bar{f}_3$ shows an output terminal of flip-flop circuit $F_3$. A symbol $\bar{e}'$ designates that it represents a 1 when flip-flop E' is reset. The relationship between signals at various terminals are shown by the table shown in FIG. 6 wherein 1 represents the presence of a signal and 0 absence of a signal.

The operation of the novel telephone apparatus will be described hereunder according to the fourteen states described in the various respective objects described above.

STATES 1, 2

The operation automatically responds to a signal sent from an office by sending out a series of information regarding the called party (FIG. 7 shows the chart for this case)

When a signal arrives across terminals 1 and 1', FIG. 1, from a telephone exchange, this signal is impressed upon terminal 2 of control device CO via the following circuit:

Exchange - 1 - $x_1$ - primary of $T_1$ - $x_2$ - 1' - exchange.

As a result, the signal appearing across the secondary winding of transformer $T_1$ sets the flip-flop circuits shown in FIG. 4 through following circuit.

Ground - secondary of $T_1$ -terminal 2 - shaping and amplifier $$\text{—flip—flops}\begin{Bmatrix} A'.T' \\ L'.X' \end{Bmatrix}\text{—ground.}$$

As a result, these flip-flop circuits are set and relays A, T, L and X corresponding to these flip-flop circuits operate to transfer contacts $x_1$ and $x_2$ to establish a circuit shown in FIG. 1 which can be traced as follows:

Exchange - 1 - $x_1$ - primary of $T_2$ - $x_2$ - 1' - exchange.

Whereupon a communication circuit is established, while at the same time the received signal is ceased. Further a transfer contact $l$ is operated to establish the following circuit.

Telephone set - $l$- secondary of $T_6$ - telephone set.

Thereafter, a series of operations are performed according to the conditions established by the calling party.

Closure of contact $a$ energizes motor M (FIG. 3D) for driving response device RS (FIG. 1) to send its output to the communication channel through the primary winding of transformer $T_3$. Since contact $t$ is closed following circuits are established.

Secondary of $T_3$ - secondary of $T_2$ -$t$ - $k$ - secondary of $T_3$ (1)

Exchange - 1 - $x_1$ - primary of $T_2$ - $x_2$ - 1' - exchange. (2)

Reproduction by the response device may be made by using a conventional tape recorder. In the example, illustrated herein an endless tape is used for this purpose, as shown in FIG. 3D. The reproduction of the recorded information or words is made in two blocks or steps. Information to be reproduced in the first step or block is recorded in a manner as has been already described wherein upon closure of contact a in FIG. 3D, motor M starts to begin the reproduction for the first step. The next block or second step provides recorded information to be reproduced for accomplishing the fourth object of the invention described above. In this step, as conductive foil 14 passes sliding contacts 15 and 16 contact $a$ is opened to stop the running of the tape in a manner well known in the art.

FIG. 3A shows a state in which the reproduction of the recorded information in the first step has just been completed. FIG. 3B shows a state in which contact $a$ is opened to deenergize motor M. FIG. 3C shows a state in which the conductive foil 14 has stopped beyond contacts 15 and 16 after deenergization of motor M due to the inertia of motor, pulley and another moving parts. In the state shown in FIG. 3A, transistor $Tr_2$ is conductive due to base biasing resistors $R_5$ and $R_6$ while transistor $Tr_3$ is OFF. In the state shown in FIG. 3B, as the bias voltage is grounded through foil 14 and contacts 15 and 16, transistor $Tr_2$ is OFF whereas transistor $Tr_3$ is ON, with the result that the output from terminal 4 is a negative pulse as shown in FIG. 3E. But after an interval t during which foil 14 passes over contacts 15 and 16, a positive pulse is produced. In this manner, from the start, reproduction of the recorded information in the first step is made by the closure of contact $a$ (see FIG. 3D). The reproduction is stopped in the state shown in FIG. 3C. However, when the contact $a$ is closed again the reproduction of the recorded information in the second step is made which is terminated in the state shown in FIG. 3D.

When the circuits identified above by (1) and (2) send out signals to the line in the first step, and when a negative pulse is produced at terminal 4 at an instant shown in FIG. 3B, this signal is amplified and reversed in polarity by an amplifier and the amplified signal acts to reset flip-flop circuits A' and T'. After the elapse of interval $t$ the circuit established in paragraph (1) is interrupted and the contact $a$ is also opened to stop the tape as shown in FIG. 3D for waiting next signal.

STATE 3

Figures 8, 10:
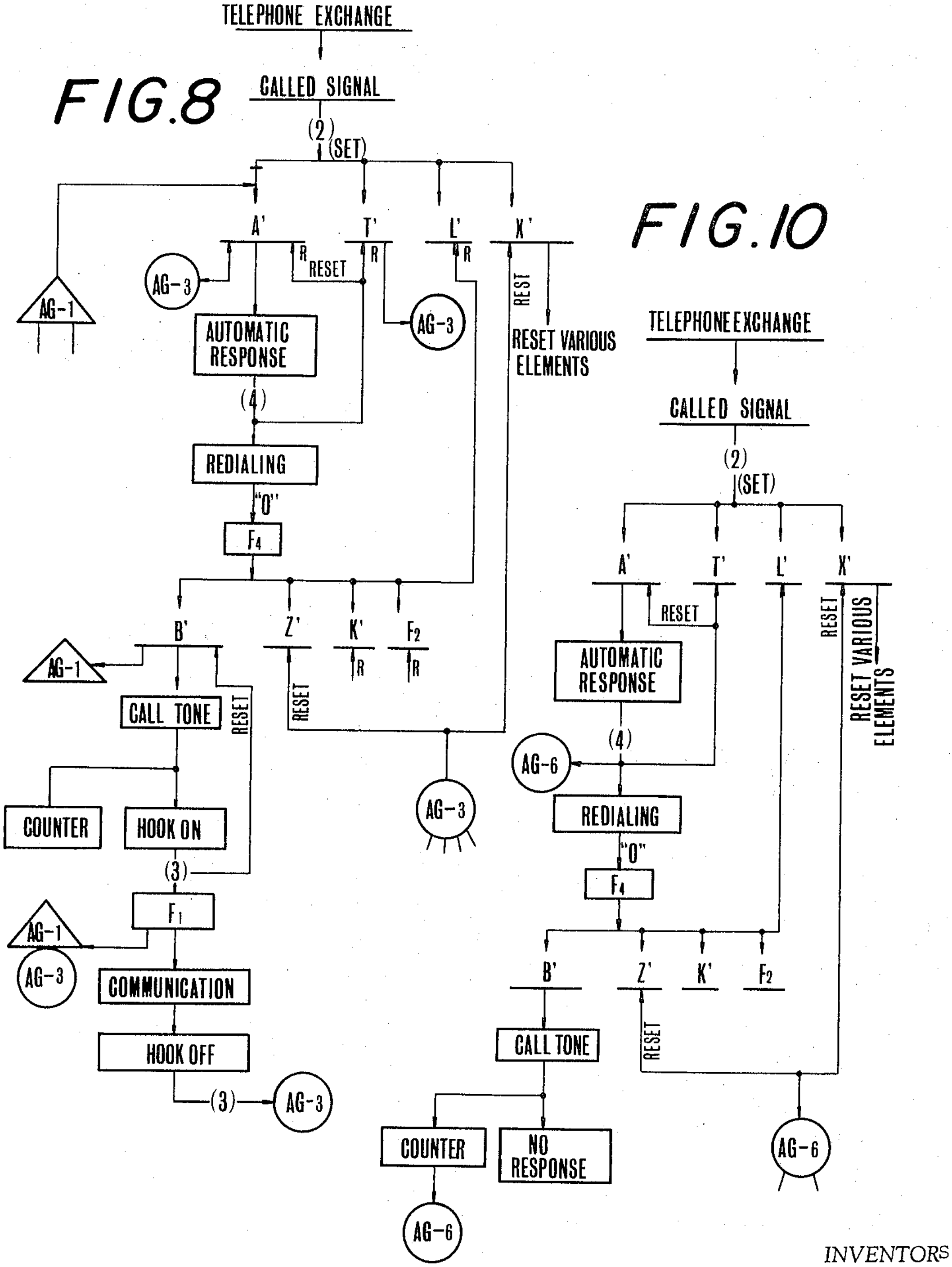
FIG. 8 is a chart to explain the proceeding of the connection where a telephone set is connected by the dialing operation.
FIG. 10 shows a chart to explain the steps of processing when a calling tone is sent out over a period more than a predetermined interval.
Figure 9:
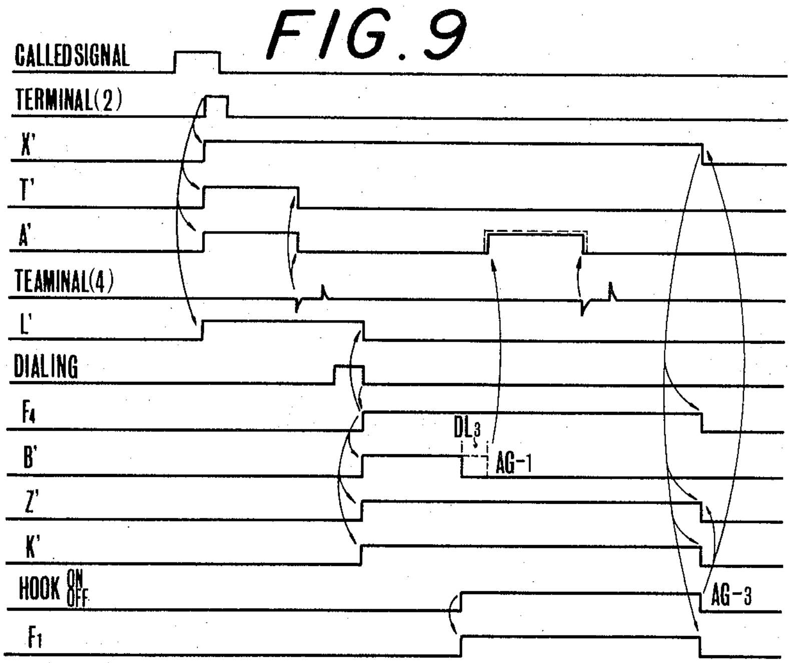
FIG. 9 shows a graph showing the sequence of the connection shown in FIG. 8.

The case wherein the line is connected to a telephone set in response to a redialing signal (see FIGS. 8 and 9)

When a calling party confirms the number according to the guidance afforded by the information reproduced in the first step and when the party dials the confirmed number, push button dial signals are received through the following circuit, and thereafter a call tone is sent out to the line. Referring again to FIG. 1, the signal is received by the primary of transformer $T_2$ through the telephone exchange. Then the signal passes through a circuit:

Secondary of $T_2$ - $e_2$ - $b_1$ - $z$ - primary of $T_5$ - secondary of $T_2$.

The signal appearing on the secondary winding of transformer $T_5$ is applied to terminal 6 of control device CO via a receiver R to set the number therein. The receiver R, number setter (of FIG. 4), etc. are of the well known circuit construction comprising a filter for separating two frequencies, resonance circuits for respective frequencies, a timer, memories and the like elements. Denoting the number of a telephone set by 0, then an output signal 1 is provided at the 0 terminal of the number setter by an input signal from terminal 6 shown in FIG. 4 to set flip-flop circuit $F_4$. As a result, terminal $f'_4$ produces an output 1 so that flip-flop circuits B', Z', $F_2$ and K' are set. Consequently, relays B, Z and K associated therewith are operated. Further, flip-flop circuit L' is reset, so that relay L is restored to close its contact $l$. Contact $b_3$ is closed to generate a call tone and its output counts the number of interruptions of the telephone call tone through make contact $b_2$. Since contacts $x$ and $b_1$ are opened, the call tone is sent out from terminal 5 to the line through transformer $T_4$ shown in FIG. 1. In this example, a tone ringer is used as the bell of the telephone set. The circuit of the tone ringer can be traced in FIGS. 1 and 2 as follows.

$T_4$ - $l$ - 9 - HS - 10 - 9' - secondary of $T_2$ - $e_2$ - $T_4$ The call tone is also sent to the calling party through transformer $T_2$.

When the called party responds, the call tone is stoped and the secondary side of transformer $T_4$ is short circuited to prevent call loss. The hook-on is detected by the detector of the telephone set to pass talking current through a circuit as follows Ground - E - $R_1$ - $T_2$ - $e_2$ - $b_1$ - $l$ - 9 - 11 - 9' - $T_2$ - $R_2$ - detector of the telephone set - ground Consequently the following circuit is established $T_2$ - $e_2$ - $b_1$ - $l$ - 9 - telephone set - 9' - $T_2$ FIG. 2 shows an electrical connection of the detector of the telephone set. Since direct current is blocked from passing through the tone ringer circuit 10, the point P is at the ground potential, transistor Tr, is maintained OFF. Thus, a positive potential appears at terminal 3 which means a 1 in the logic circuit. When the call tone is sent out to the line from control device CO and when the subscriber hooks-off in response to the operation of the tone ringer circuit 10, the talking current flows through a circuit $$\text{Groud}-R_1-T_2-9-HS-T_2-R_2-\left\{\begin{matrix}\text{base of } Tr_1\\ R_4\end{matrix}\right\}-\text{ground.}$$

Thus, transistor $Tr_1$ is rendered conductive by the current flowing through its base electrode whereby the ground potential appears at terminal 3 thus indicating a 0. The purpose of capacitor $C_1$ is to eliminate chattering when the hand set is hooked-off and when contact $W_1$ is closed. Consequently, the potential of terminal 3 varies between 0 and 1 according to the OFF and ON conditions of the hook. This variation in the potential of terminal 3 controls AND gate circuit $AG_{-3}$ shown in FIG. 4. Further, this variation is differentiated and amplified to reset flip-flop circuit B'.

In the circuit shown in FIG. 4, by the operation of a selection push button, the relay W is actuated to close its contact $W_1$ shown in FIG. 2. Upon closure of contact $W_1$, current flows to the base electrode of transistor $Tr_1$ from source +, thus turning ON transistor $Tr_1$. Consequently, even when the talking current of the telephone set is interrupted, so long as contact $W_1$ is held closed, terminal 3 is still maintained at the state of "0" thus continuing the operation to be described hereinafter.

As above described, by the hook-off operation, flip-flop circuit B' is reset to restore relay B thus closing its contact $b_1$. Then, the secondary of transformer $T_4$ is short circuited to prevent talking loss. Opening of contacts $b_3$ and $b_2$ (FIG. 4) terminates the call tone as well as the operation of the counter. Further, flip-flop circuit Z' is set to actuate relay Z, whereby its contact $z$ is opened to interrupt the circuit received from the line. Although the response device RS is rendered inoperative in the first step, since it becomes unnecessary to reproduce the recorded information in the second step as a result of the response of the telephone set, it is necessary to return the response device to the original state without sending out the reproduced information to the line. When the telephone set is hooked-on, flip-flop circuit $F_1$ is set to provide a 1 on terminal $f_1$ whereas flip-flop circuit B' is reset to provide a 0 on terminal $b'$ but owing to the provision of a delay circuit $DL_3$ the state 1 is maintained for a while and thereafter changed to 0, so that an output is sent through AND gate circuit $AG_{-1}$ to set flip-flop circuit A'. Operation of relay A closes its contact $a$ to start the motor for reproducing the recorded information thus sending the information reproduced in the second step. However, the reproduced information will not be sent to the line because the flip-flop circuit T' has been reset in the first step. As has been discussed in connection with FIG. 3, the output is applied again to terminal 4 successively through the steps shown in FIGS. 3A and 3B to reset flip-flop circuit A' to assume the state shown in FIG. 3D. When the telephone set is hooked-off upon completion of the talking, as flip-flop circuit $F_1$ is in the set state at the time of hooking-off as already has been described in connection with FIG. 2, contact $F_1$ provides the state of 1. Further, since flip-flop circuits A' and T' are reset, both terminals $\overline{a}$ and $\overline{f}$ provide an output 1. Accordingly, terminal 3 provides an output 1 to send out this output 1 through AND gate circuit $AG_3$ to reset flip-flop circuits Z' and X'. Upon resetting of flip-flop circuit X' thus producing a 1 on terminal $\overline{x}'$, the output is differentiated and amplified to reset various elements. Then relay X is restored to transfer its contacts $x_1$ and $z_2$ to open the subscriber' s line. Thus, the apparatus is returned to the original state to prepare for the next reception and transmission of the signal.

STATE 4

Figure 11:
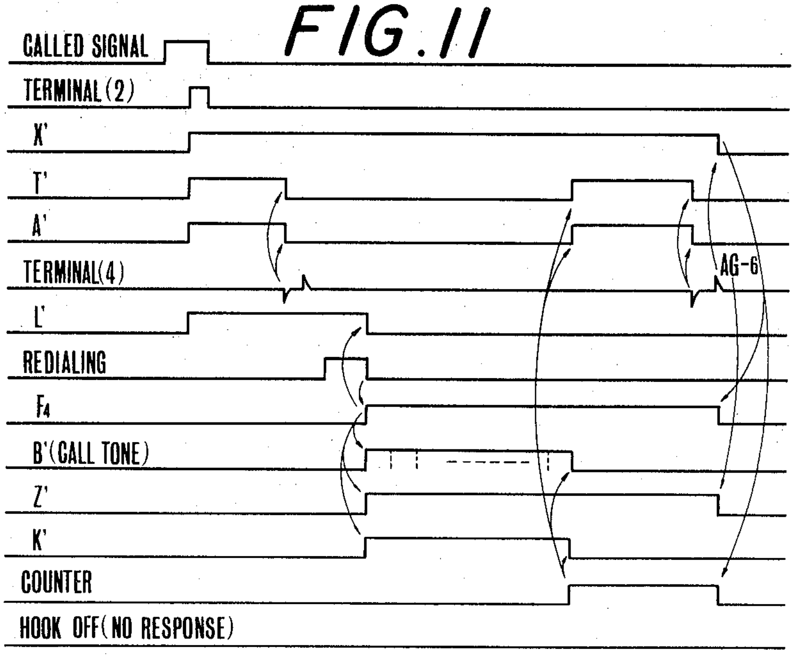
FIG. 11 shows a graph showing the sequence of the steps of processing shown in FIG. 10.

When the call tone is sent over a period more than a predetermined interval (See FIGS. 10 and 11).

As has been described in connection with FIG. 4, the number of call tones is counted by the counter, and when the number counted exceeds a predetermined number, sending of the call tone is terminated and the counter sends out an output. This output is used to reset flip-flop circuits B' and X' and to set flip-flop circuits A' and T'. Relay B is restored to terminate the input to the counter as well as the call tone and to short circuit transformer $T_4$. Operation of relay T closes its contact t to establish a circuit for sending out the signal from transformer $T_3$. When the relay A operates, the tape which has been stopped at the end of the first step (or block) is driven again to reproduce information representing that the second step (or block) is not present, and the reproduced information is sent through transformer $T_3$. The circuit for sending the reproduced information is the same as that used in the first step. The first negative pulse produced upon completion of the second step is inverted and then amplified to reset flip-flop circuits A' and T' thus stopping the tape. The next positive pulse is used to cause the counter to provide an output 1 so as to send an output through AND gate circuit $AG_{-6}$ to reset flip-flop circuits Z' and X' whereby the circuit is opened to prepare for the next operation.

Figure 13:
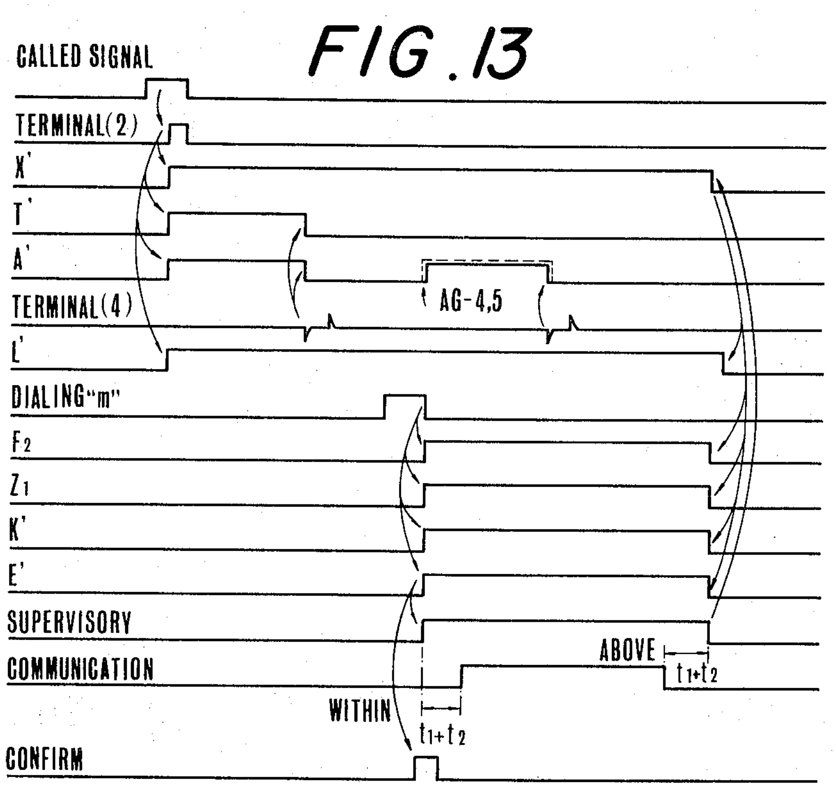
FIG. 13 is a graph to explain the sequence when the selection shown in FIG. 12 is made.
Figure 12:
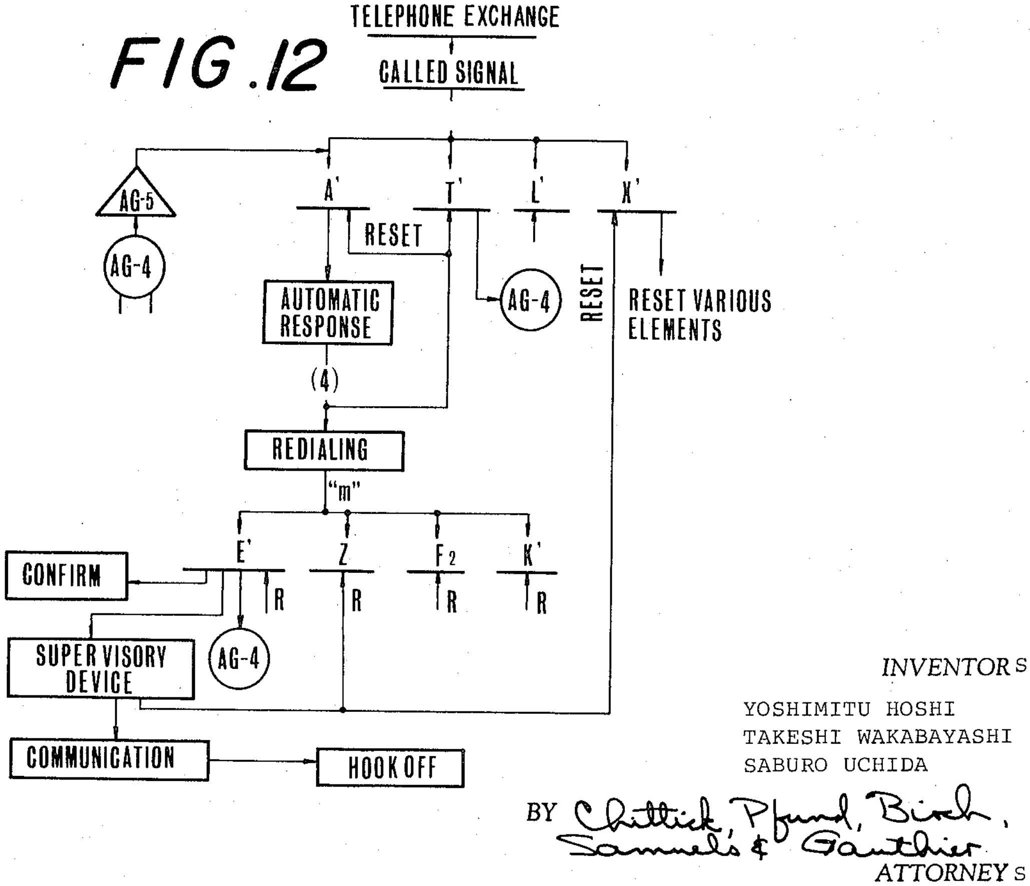
FIG. 12 is a chart showing the sequence of connection where a terminal apparatus other than a telephone set is selected.
Figures 14, 15:
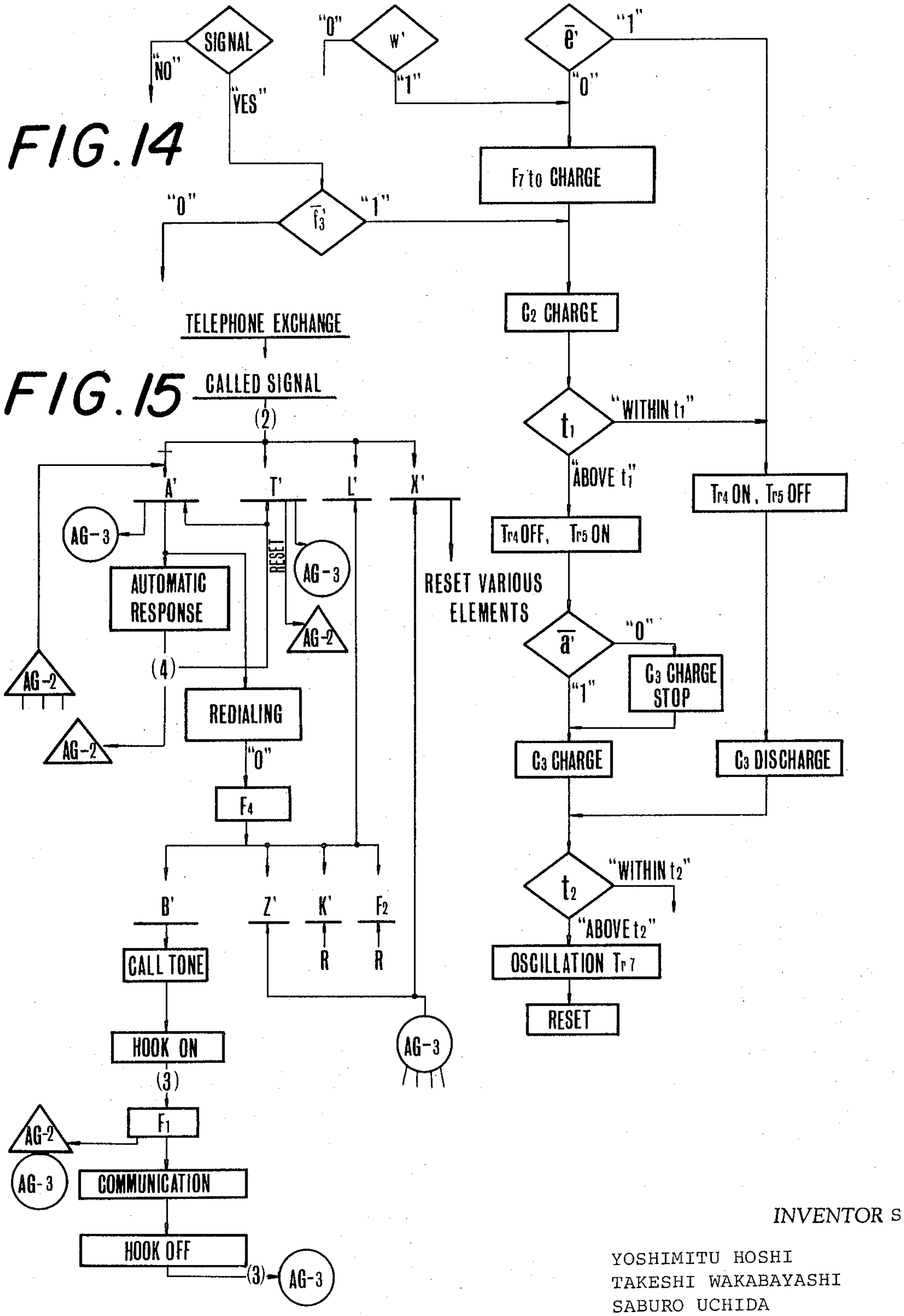
FIG. 14 is a chart to explain the operation of a signal supervisory device.
FIG. 15 is a chart showing the steps of the procedures where a telephone set is called and connected to the line.

STATE 5

Where terminal apparatus other than the telephone set is redialed by push buttons (See FIGS. 12 and 13).

Where a terminal apparatus, for example number "M", is selected when the guidance of the response device in the first step is terminated, the same process steps as those described hereinabove are repeated until an output 1 is produced on terminal M of the number setting device shown in FIG. 4. At this time, flip-flop circuit $H'_{-m}$ is set and relay $H_{-m}$ is operated to close its contact $h_{-m}$ shown in FIG. 1. At the same time, flip-flop circuits E', Z', $F_2$ and K' are also set to operate relays E, Z and K. As a result of the setting of flip-flop circuit E', an output 1 is produced on its terminal $e'$, and this output is differentiated to operate the one shot multi-vibrator to send out a confirming signal through terminal 8 over a short interval. At the end of the first step for driving the recording tape, flip-flop circuit T' is reset to produce an output 1 on terminal $\overline{T}'$. At this time, since the number M is selected and the flip-flop circuit E' is set to produce an output 1 on terminal $e'$, AND gate circuit $AG_{-4}$ provides an output 1 whereas flip-flop circuit W' is reset thus producing an output 1 on its terminal w'. As a consequence, AND gate circuit $AG_{-5}$ provides an output 1 to set again flip-flop circuit A'. Thus, relay A is operated to drive motor M (FIG. 3) to initiate the reproduction in the second step. However, due to the opening of contact $k$, relay A is deenergized. Also relay T is restored to open its contact $t$, so that the reproduced signal will not be sent out to the line. Upon completion of the second step, relay A is returned to the original state thus stopping the tape. By the operation of relays Z and E, contact $e'_1$ (FIG. 1) is closed while contacts $l$ and $z$ are opened and the receiver R is disconnected so that the telephone exchange and the terminal apparatus $H_{-m}$ are interconnected through transformers $T_2$ and $T_7$, the circuit established at this circuit tracing $T_2$ - $e_1$ - primary of $T_7$ - $T_2$ and Ground - secondary of $T_7$ - ($h_{-m}$) - $H_{-m}$ - ground.

Supervision of the signal is done through the contact 8 of control device CO and when the signal is interrupted for an interval longer than a predetermined period an output signal is sent to reset flip-flop circuits Z' and X' to disconnect the talking line thus returning the system to the original state.

The detail of the supervisory device WP performing this function shown in FIG. 4 is shown in FIG. 5. As shown, for each signal terminal input 8 is provided control terminals $\overline{e}'$, $w'\overline{f}_3$ and $\overline{a}'$, but when terminal e' is in the state of a 1 transistor $T_{r7}$ does not provide an output irrespective of the conditions of another terminals. More particularly when terminal $\overline{e}'$ is in the state of a 1 transistor $T_{r4}$ is ON. Consequently transistor $T_{r7}$ is maintained non-conductive through diode $D_4$. Since the flip-flop circuit E' is not set unless a terminal apparatus is selected, control terminal e' is maintained at a 1. Accordingly, the table shown in FIG. 6 shows the relationship between operations of various parts when any one of the terminal apparatus is selected, or when the supervisory device operates. This table shows that the condition in which transistor $T_{r7}$ provides a reset signal is that terminal $e'$ is in the state of a 0, AND gate circuit $AG_{-10}$ produces an output 0, flip-flop $F_7$ is inoperative and terminal $\overline{a}'$ is in the state of a 1, that is, the motor for reproducing recorded information is inoperative.

The relation between the operations of respective terminals will be given hereunder with reference to FIGS. 4 to 6 and FIG. 14.

The operation of the apparatus when the number of the apparatus set is selected will firstly be described. Under these circumstances, terminal $w'$ is in the state of "0" whereas terminal $\overline{f_3}$ in the state of 1.

Upon selection of any one of the terminal apparatus, terminal $e'$ will be in the state of 0 so that the output of the inverting amplifier is differentiated to operate one shot multivibrator $F_7$. The output of the one shot multivibrator charges a capacitor $C_2$ through diode $D_2$. The discharge circuit of capacitor $C_2$ extends through $$C_2 - R_7 - \left\{ \begin{array}{c} R_8 \\ \text{base—emitter circuit of transistor } T_{r4} \end{array} \right\} - \text{ground.}$$

Thus transistor $T_{r4}$ is rendered ON during the discharge for an interval $t_1$ and then rendered OFF. Thus, capacitor $C_2$ is charged by the operation of one shot multivibrator $F_7$. When transistor $T_{r4}$ is ON, as the upper terminal of capacitor $C_3$ is grounded through diode $D_4$ and transistor $T_{r4}$, the terminal voltage of capacitor $C_3$ is not influenced by the condition of terminal $\overline{a}'$. The signal impressed upon terminal 8 is shaped and amplified by an amplifier and then charges capacitor $C_2$ through AND gate circuit $AG_{-10}$, the discharge of this capacitor rendering conductive transistor $T_{r4}$ as in the case of the operation of one shot multivibrator $F_7$. Transistor $T_{r5}$ is controlled by transistor $T_{r4}$ so that the former is rendered ON or OFF when the letter is ON or OFF respectively. When terminal $\overline{a}'$ is in the state of a 0 transistor $T_{r6}$ does not complete a charging circuit for capacitor $C_3$. When terminal a' is in the state of a 1, transistor becomes ON thus establishing a charging circuit for capacitor $C_3$ which can be traced as follows.

$+ - R_9 - T_{r5} - T_{r6} - C_3$ - ground.

Of course, when terminal $\overline{a}'$ becomes 0 the charging of capacitor $C_3$ is terminated.

Figure 22:
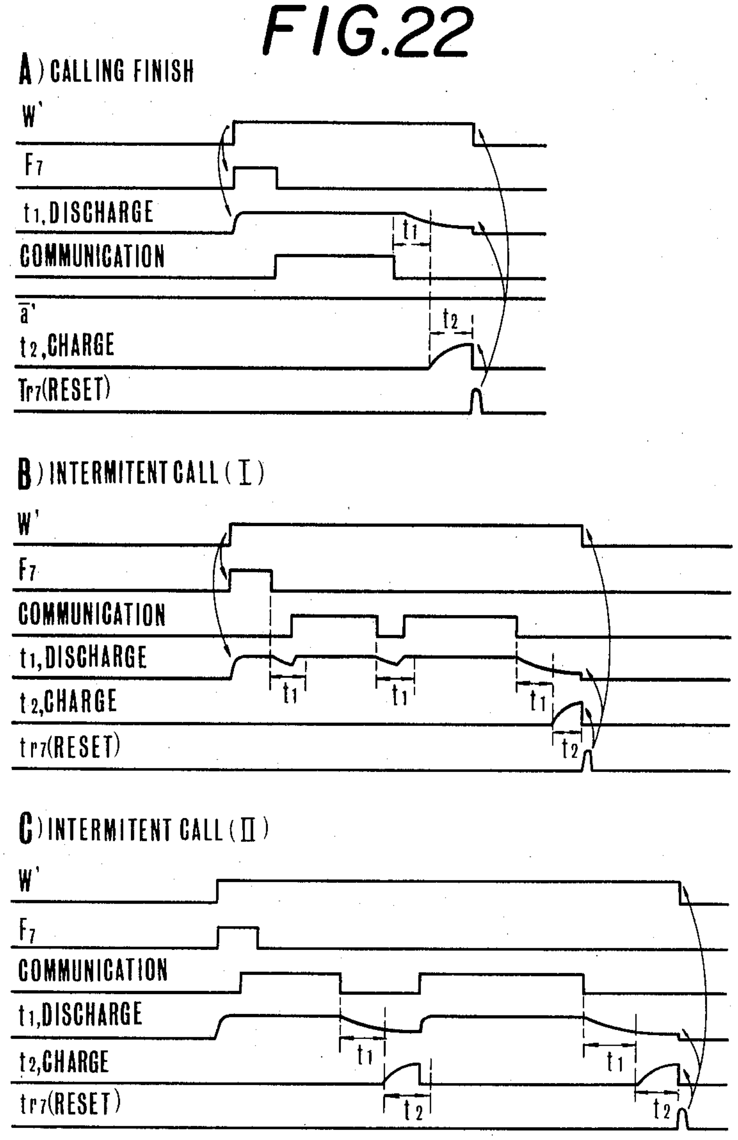
FIG. 22 is graph to show the sequence for explaining in detail the operation of the signal supervisory device.
Figure 22:
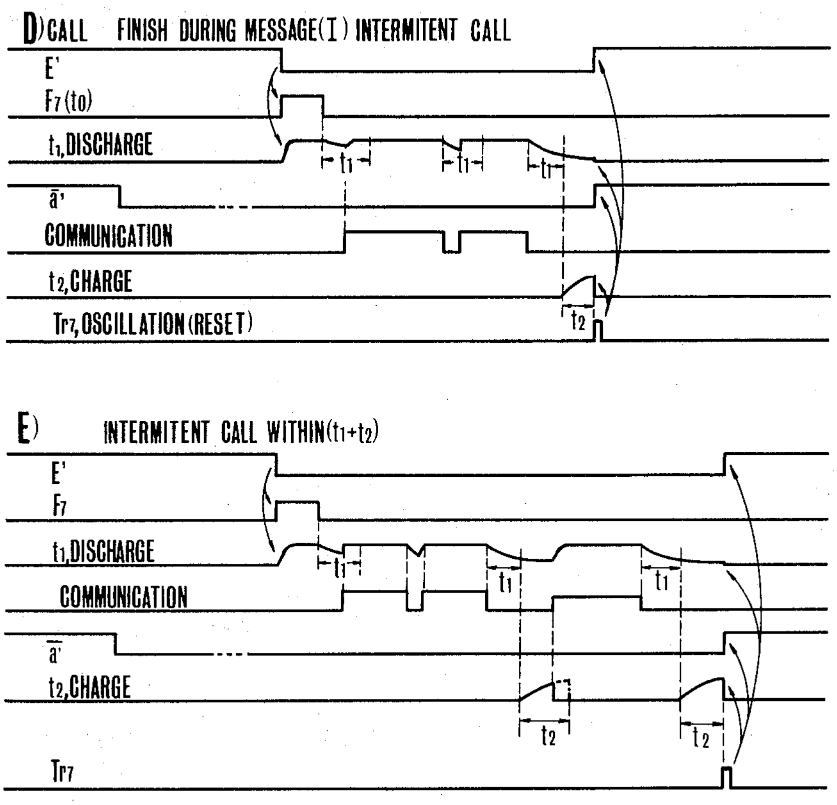

As above described, when transistor $T_{r4}$ becomes conductive, capacitor $C_3$ is discharged through this transistor and diode $D_4$. Transistor $T_{r7}$ is a unijunction transistor which creates an oscillation and produces a reset signal when the voltage across capacitor $C_3$ exceeds a predetermined value. This voltage is designated by $V_{c3}$ and the instant at which the oscillation occurs by $t_2$. When a calling party depresses his push button for substituting his own terminal apparatus for his telephone set for the purpose of establishing a communication circuit, flip-flop circuit W' will be set by depression of the push buttom and E' will be also set by a signal of the output terminal $w'$ of said W'. Regarding the condition of a supervisory device (WP), as the terminal W' provides a 1 output, e' provides a 0. When terminals $f_3$, $a'$, $w'$ provide a 1 $e'$ provides an output 0 thus turning OFF transistor $Tr_4$ thus turning OFF transistor $T_{r4}$ to continue transmission of the input signal applied to terminal 8 in a manner described above. Upon interruption of the communication for a period longer than $(t_1 + t_2)$, and when the voltage across capacitor $C_3$ reaches $V_{c3}$, transistor $T_{r7}$ is reset to open the line thus returning to the original condition. The sequence of this operation is shown by FIGS. 22A, 22B or 22C.

The connection of one of the terminal apparatus by the operation of the push button dial and the processing of the tape for reproducing the recorded informations have been described in the foregoing description. Turning now to the supervisory device, when terminal $\overline{e}'$ provides an output 0 so that the same condition as above described is established thus restoring the original condition. The sequence of this operation is shown by FIGS. 22D and 22E.

STATE 6

Figure 16:
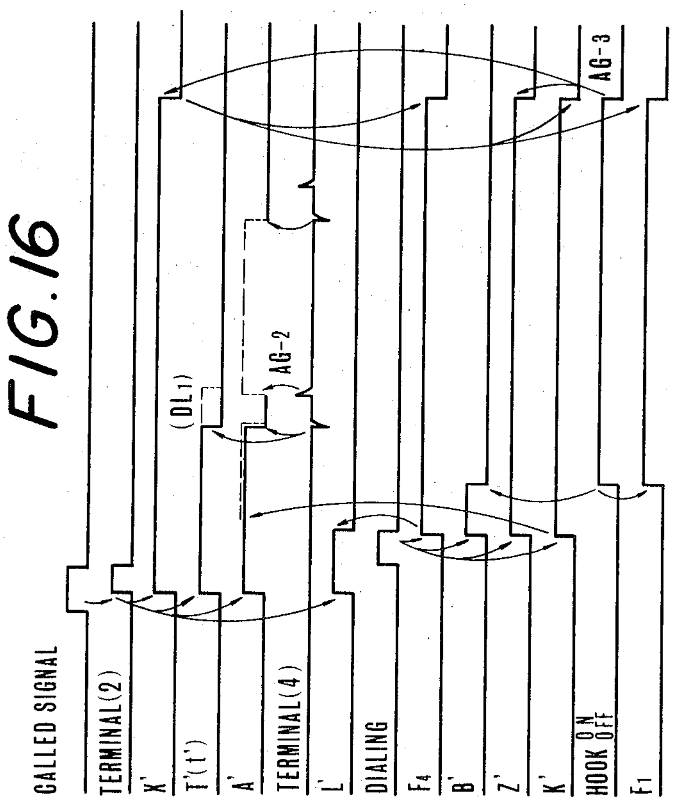
FIG. 16 is a graph to explain the sequence during the steps of procedures shown in FIG. 15.

Connection of the telephone set while the information is being reproduced during the first step of the overall guidance. (See FIGS. 15 and 16).

During the reproduction of the information in the first step, as flip-flop circuit Z' is reset, similar to the situation described with respect to STATE 3, the received signal sets flip-flop circuits A', T', L' and X' and even when the push button dial is operated while the motor M is driving the tape, the reproduced information is received through contact z and transformer $T_5$ so as to produce a 1 on terminal 0 of the number setting device for setting flip-flop circuit $F_4$ whereby flip-flop circuits B', Z', $F_2$ and K' are set. Further, flip-flop circuit L' is reset. Accordingly, by the opening of contact $k$, the signal is transmitted through transformer $T_3$, and the motor is energized. Relay B produces a call tone but hook-on terminates the call tone to set the flip-flop circuit $F_1$, thus establishing a taking line. At this time, since a 1 appears on terminal f' and the output 0 on terminal b' is delayed by delay circuit $DL_3$, AND gete $AG_{-1}$ provides an output 1 but no change is made because the driving motor is in operation. Upon completion of the first step, the first negative pulse (FIG. 3E) received by terminal 4 is inverted and amplified to reset flip-flop circuits A' and T'. As a result, these flip-flop circuits become reset for a moment, and the output at terminal $t'$ of flip-flop circuit T' is maintained at a 1 for an interval equal to the delay time of delay circuit $DL_1$. When the next positive pulse is applied on terminal 4, terminal $f'$ provides an output 1 so that three 1 inputs are applied to AND gate circuit $AG_{-2}$ thus resetting again flip-flop circuit A' to operate relay A. Relay A closes its contact $a$ to energize the tape driving motor. When the second step is over, again a negative pulse is applied upon terminal 4 to reset flip-flop circuit A'. The delay time t' of delay circuit $DL_1$ is set to be slightly longer than the time t shown in FIG. 3E. Since flip-flop circuit T' has been reset and flip-flop circuit K' has been set, the reproduction of the recorded information during the second step is interrupted in the same manner as during the first step thus stopping the reproduction of the tape as shown in FIG. 3D. Upon hook-on, various component elements return to their original conditions in the same manner as has been described above with respect to STATE 3.

Figure 17:
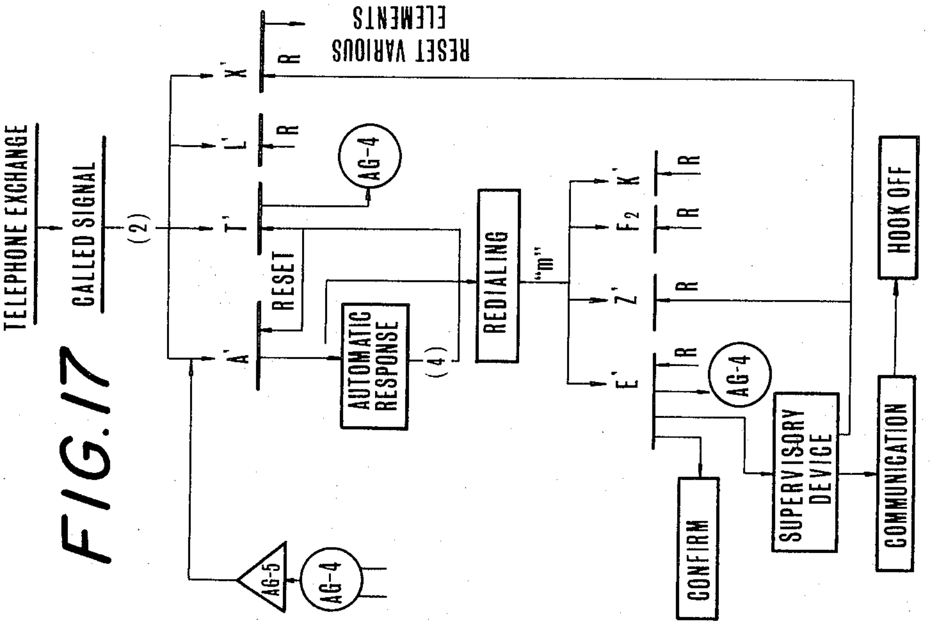
FIG. 17 is a connection chart where one of the terminal apparatus is selected while information in the first block is being reproduced.
Figure 18:
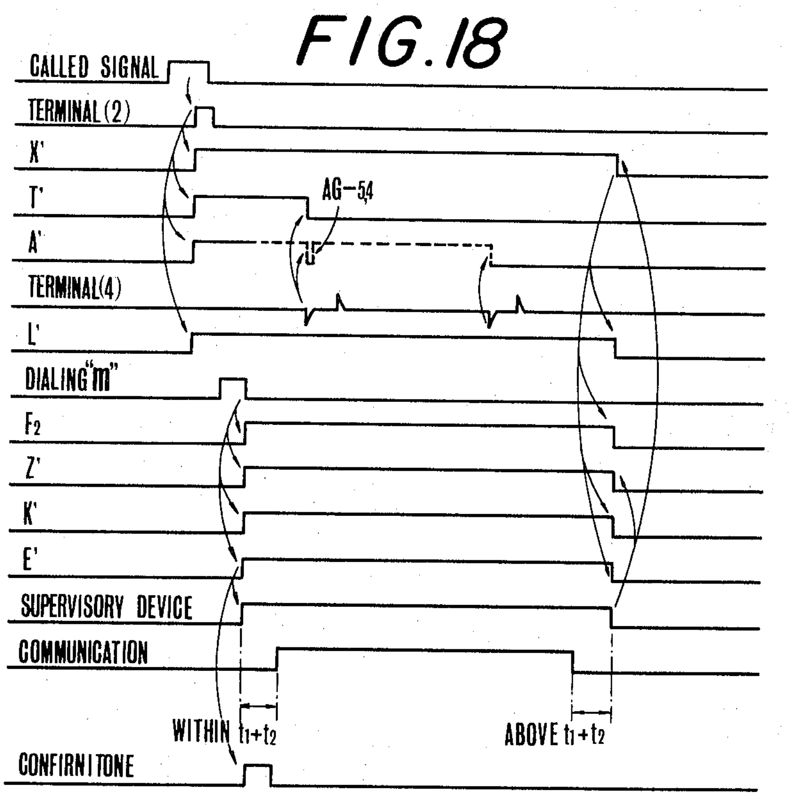
FIG. 18 is a graph to explain the steps of connections shown in FIG. 17.

STATE 7

Where the terminal apparatus is selected during the reproduction in the first step of the overall guidance. (See FIGS. 17 and 18).

The operating system of this case is similar to that of STATE 5 with the exception that the push button dial is operated during the first step for selecting the terminal apparatus. After setting the number, various flip-flop circuits are set in the same manner as has been described concerning STATE 5, but since the first step is being guided, flip-flop T' is in the set state. Accordingly, after setting the number, the transmission of the reproduced information over the line is interrupted by the contact $k$ of relay K. When flip-flop circuits A' and T' are reset by the negative pulse impressed upon terminal 4 at the end of the first step, although there is no output from AND gate circuit $AG_{-4}$, terminal $\overline{t}'$ of flip-flop circuit T' provides an output 1 and terminal $e'$ of flip-flop circuit E' provides an output 1 so that flip-flop circuit A' will be immediately set by the outputs from AND gate circuits $AG_{-4}$ and $AG_{-5}$ whereby the tape is advanced without transmitting the information reproduced in the second step and the tape is stopped in the state shown in FIG. 3D. Communications between terminal apparatus are supervised by the supervisory device in the same manner as above described in STATE 5. Upon completion of the communication, the line is opened to restore the original condition.

STATE 8

Figure 19:
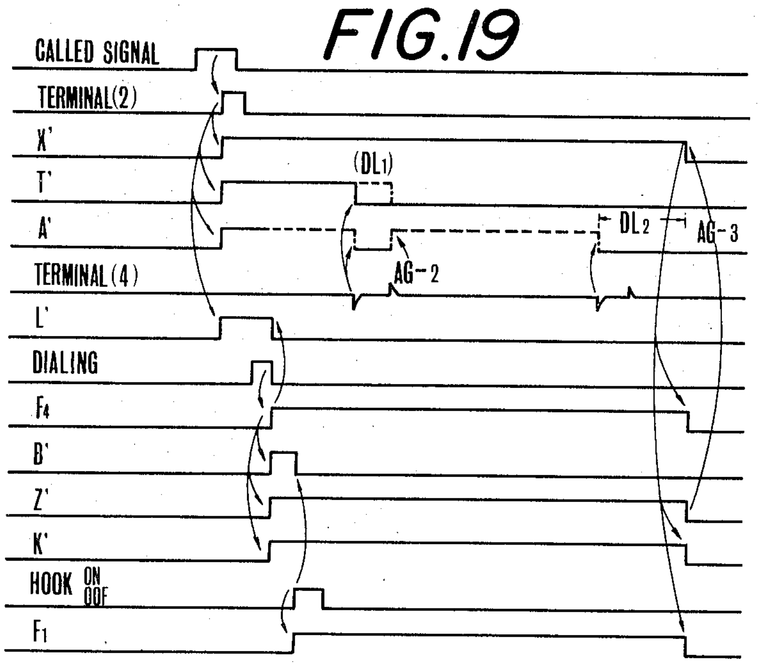
FIG. 19 is a graph to show the sequence where the speech through the telephone set is terminated during the reproduction of the first block.

When the telephone set is connected during the reproduction in the first step of the overall guidance and the communication is terminated (See FIG. 19).

Again a circuit similar to that in STATE 6 is established except that the timing of sending out the output from AND gate circuit $AG_{-3}$ is different. With particular reference to AND gate circuit $AG_{-3}$, in the case of STATE 6, the terminal $f_1$ of flip-flop circuit $F_1$ provides an output 1, the terminal $a'$ of flip-flop circuit A' an output 1, and the terminal f' of flip-flop circuit T' provides an output 1 while the information reproducing device has been returned to the original state to wait for the completion of the communication, that is hook-on occurs. As a result when hook-on, flip-flop circuits Z' and K' are reset. On the other hand, in the case of STATE 8, even when hook-on occurs upon completion of the communication, operation of the information reproducing device is suspended. As a consequence, at the end of the second step, flip-flop circuit A′ is reset when the terminal 4 provides an output 1, the terminal $\overline{t}'$ of flip-flop circuit T′ provides an output 1 and the terminal $f_1$ of flip-flop circuit $F_1$ provides an output 1 thus waiting the time when the terminal $\overline{a}'$ of flip-flop circuit A′ provides an output 1. When flip-flop A′ is reset to provide a 1 output at its terminal $\overline{a}'$, this output is delayed by delay circuit $DL_2$ and then sent through AND gate circuit $AG_{-3}$ to reset flip-flop circuits X′ and Z′ thus restoring the original state. But the delay time of the delay circuit $DL_2$ is selected to be slightly longer than the time $t$ shown in FIG. 3E. This time is selected to correctly stop the tape driving motor at the end of the first step and to prevent the output from being sent out through AND gate circuit $AG_{-3}$ while the second step is being accomplished again by the positive pulse impressed upon terminal 4 and supplied through AND gate circuit $AG_{-2}$. More particulary, since the communication has been completed, terminal 4 provides an output 1, terminal $f_1$ of flip-flop circuit $F_1$ provides an output 1 and terminal $t$ of flip-flop circuit T′ provides an output 1. Thus, since all inputs are 1, AND gate circuit $AG_{-2}$ provides an output 1 in the absence of a delay caused by delay circuit $DL_2$. For this reason, above described conditions are added.

STATE 9

Figure 20:
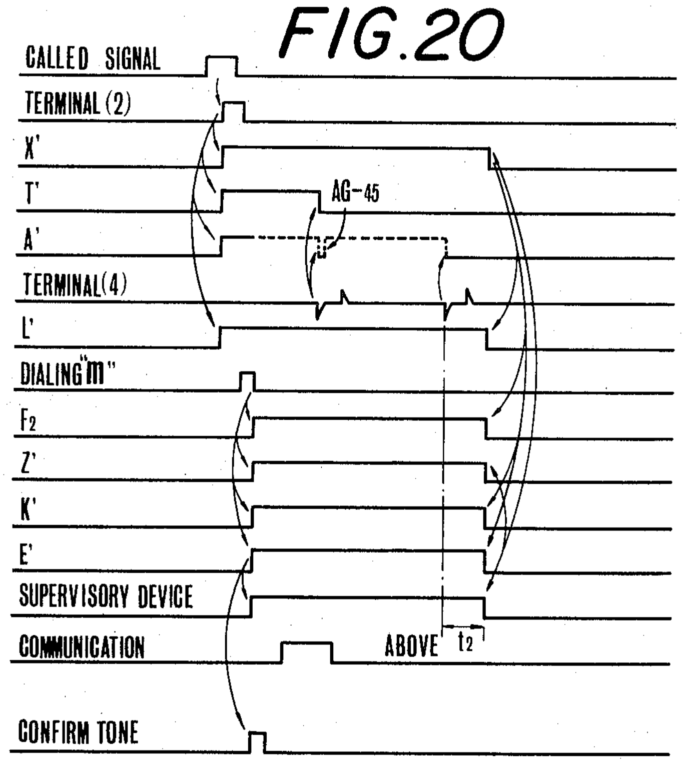
FIG. 20 is a graph showing the sequence where the use of the terminal apparatus is completed while information in the first block is being reproduced.

When the terminal apparatus are used during the first step of the overall guidance and the communication is completed (See FIG. 20).

A circuit similar to that in state 7 is established except that the timing for initiating the final operation of the supervisory device is different. Although in the case of STATE 7 a reset signal is transmitted upon termination of the communication, in the present case, even after termination of the signal, the motor for driving the tape is still energized. Thus, in the case of STATE 7, a reset pulse is supplied to flip-flop circuits Z′ and X′ at a time exceeding, $(t, + t_2)$, but in the case of STATE 9 the flip-flop circuit A′ is reset by a negative pulse generated at the end of the second step and applied to terminal 4 to produce an output 1 at terminal $\overline{a}'$. Thus, only after an interval larger than $t_2$ from the condition established in the case of STATE 7, a reset pulse is applied to flip-flop circuits Z′ and X′ to restore the initial condition.

STATE 10

The case wherein a number other than the number guidance (caused by the first step) is dialed inadvertently.

Referring again to FIG. 4, the same operation as that already described is repeated until a 1 is produced at the terminal N of a number setting device but the operation is different in that one shot multivibrator 7 is operated for a definite time to supply a busy tone to terminal 8 through flip-flop circuit $F_3$ and a busy AND gate circuit $AG_{-9}$. As the flip-flop circuits E′, Z′ and K′ (FIG. 4) have been set, the signal from terminal 8 of the control device will be sent out to the line through transformer $T_7$ shown in FIG. 1. On the other hand, the supervisory device shown FIG. 5 does not operate because a 0 is supplied to terminal $\overline{f_3}$ and because gate circuit $AG_{-10}$ is disenabled. When flip-flop circuit $F_3$ completes its operation, gate circuit $AG_{-9}$ is disenabled and the output is differentiated to reset flip-flop circuits Z′ and Y′ to restore the initial condition.

STATE 11

The case wherein the novel telephone apparatus is used for communication.

When a hand set is hooked-on, the following DC circuit will be established in the circuits shown in FIGS. 1 and 2.

Ground - source Ⓔ - $R_1$ - $T_2$ - $e_2$ $b_1$ - $l$ - 9 -

$$HS—11—9'—R_2—\left\{\begin{matrix} R_4 \\ \text{base—emitter of } T_{r1} \end{matrix}\right\}—\text{ground.}$$

Consequently, concurrently with the flow of a talking current through the telephone set, the state of terminal 3 of the control device is changed from a 1 to a 0 so that flip-flop circuits $F_1$, Z′ and X′ are through the differentiating circuit and the inverter amplifier shown in FIG. 4, although flip-flop circuit B′ is reset this causes no change of the operation. When flip-flop circuit X′ is set, relay X is operated to transfer contacts $x_1$ and $x_2$ thus establishing a DC circuit to the telephone exchange through terminals 1 and 1′. Accordingly, it is possible to confirm the dial tone through the following circuit thereby sending a dial signal to the telephone exchange.

Exchange - 1 - $x_1$ - $T_2$ - $x_2$ - 1′ - exchange.

Thus, the calling and called parties are interconnected through the telephone exchange. When hooked-on this circuit is opened to interrupt the talking current. Then, transistor $T_{r1}$ shown in FIG. 2 is turned OFF whereas terminal 3 of the control device produces an output "1", so that gate circuit $AG_{-3}$ shown in FIG. 4 is enabled since terminal $f_1$ of flip-flop circuit $F_1$ provides an output 1, terminal $\overline{a}'$ of flip-flop circuit A′ provides an output 1 and terminal $\overline{t}'$ of flip-flop circuit T′ provides an output 1 whereby flip-flop circuits Z′ and X′ are reset by the output from AND gate circuit $AG_{-3}$ thus restoring the initial state. When hooked-off, contact z shown in FIG. 1 is opened thus nullifying the effect of the push button dial signal from the telephone set.

STATE 12

The case wherein the hand set is hooked-off while one of the terminal apparatus of the telephone apparatus is in use.

The flip-flop circuit L′ shown in FIG. 4 is set by a received signal and reset only when the telephone set is called by the redialing operation or when flip-flop circuit $F_4$ is set. However the flip-flop circuit L′ will not be reset when another apparatus is selected, thus preserving its set condition. Consequently, when one of the terminal apparatus is in use, since flip-flop circuit T′ is in its set state relay L continues to operate and the transfer contact $l$ shown in FIG. 1 connects the telephone set to transformer $T_6$. As a consequence, since terminal 7 of the control device produces a busy tone, when hooked-off, this tone will be supplied to the receiver through a circuit via transformer $T_6$ that can be traced:

$T_6$ - $l$ - 9 - HS - 11 - 9′ - $T_6$

Of course, it is also possible to operate a visible display device such as a lamp (not shown) through another contact (not shown) of relay L. Thus, the hook-off operation does not affect in any way the communication between terminal apparatus.

STATE 13

The case wherein the calling party selects the terminal apparatus associated with the novel telephone apparatus.

In this case, the relative position between the calling and called parties is opposite to the cases described above and the calling party selects the terminal apparatus after hearing a confirmation signal and operates a push button shown in FIG. 4, in the case of m for example, a 1 is produced at its terminal M to set flip-flop circuit $H_{-m}$, and flip-flop circuit W'. Accordingly, relay $H_{-m}$ is operated to close contact $h_{-m}$ shown in FIG. 1 whereby the terminal apparatus $H_{-m}$ is connected across transformer $T_7$. When set, the flip-flop circuit W' (FIG. 4) provides an output 1 on its terminal w' to set flip-flop circuit E'. Since terminal $e'$ of flip-flop circuit E' provides an output 1 and terminal $\overline{t}'$ of flip-flop circuit T' also provides an output 1, AND gate circuit $AG_{-4}$ is enabled. However, since AND gate circuit $AG_{-5}$ is disenabled because a 0 is applied upon its input terminal w', flip-flop circuit A' will not be set. When terminal $\overline{e}'$ shown in FIG. 5 receives a 0, the signal is inverted, amplified and then differentiated to perform the same operation as in STATE 5. After the commencement of communication the same operation as in STATE 5 is repeated. Again, the circuit may be reset manually.

STATE 14

Figure 21:
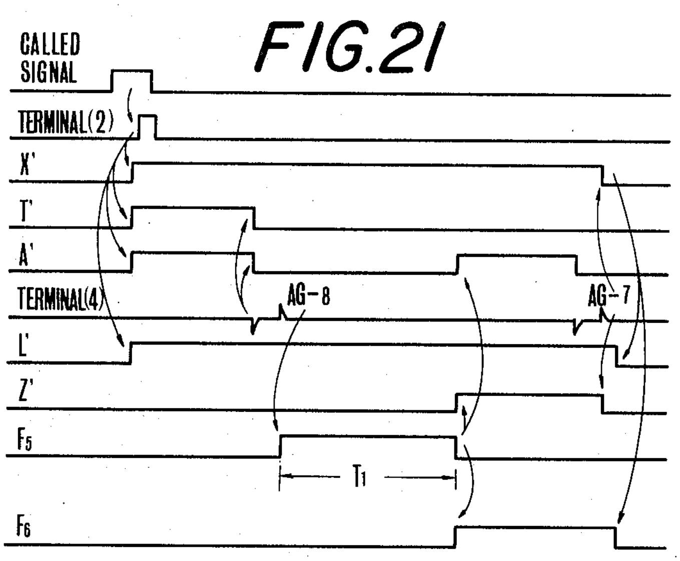
FIG. 21 shows the sequence where a call is abandoned on the way.

The call is abandoned on the way (See FIG. 21).

When the call is abandoned on the way after redialing by push buttons, since the terminal apparatus is processed manually or by the output from the counter there arises no serious trouble. However, when the call is abandoned before subsequent dialing serious trouble will be caused. In the latter case since redialing is not performed flip-flop circuit $F_2$ will not be set so that its output terminal $\overline{f_2}$ provides a 1. Since the terminal $\overline{f_6}$ of flip-flop circuit $F_6$ provides an output 1, when the positive pulse shown in FIG. 3E which is generated at the end of the first step is applied upon terminal 4, the AND gate circuit $AG_{-8}$ will be enabled to produce an output 1 to operate the one shot multivibrator $F_5$ or a timer corresponding thereto, for example, transistor $T_{r7}$ shown in FIG. 5 for an interval $_1$ representing the abandon time interval. After the elapse of this interval $_1$ the output is differentiated to reset flip-flop circuits Z', A' and $F_6$. Where redialed again within the interval $_1$, as the terminal $\overline{f_2}$ of flip-flop $F_2$ provides an output 0, the timer becomes inoperative and various elements are reset by the last reset pulse. When the positive pulse generated at the end of the reproduction of the recorded information in the second step (or block) is applied upon terminal 4, since both terminals $f_6$ and $\overline{f_2}$ of flip-flop circuits $F_6$ and $F_2$ provide outputs 1, AND gate circuit $AG_{-7}$ is enabled to produce an output 1 to reset flip-flop circuits $F_6$, Z' and X' whereby the line is opened to restore the original state. At this time, AND gate circuit $AG_{-8}$ is not enabled because the output terminal $\overline{f_6}$ of flip-flop circuit $F_6$ provides an output 0.

As above described this invention provides an improved telephone apparatus according to which through the use of the response device it is not only possible to correctly and freely select one of the terminal apparatus associated with the telephone set of another party through a telephone line selected by a push button dial type telephone set but also to detect a miscall. Moreover, as it is possible to use automatically the telephone apparatus during night time where the frequency of utilization of the telephone apparatus is relatively low, it is possible to improve business efficiency and to rationalize the efficient utilization of the line. Further, when the called party is absent or does not when the telephone set is connected to the line, it is possible to inform the calling party of the absence of the called party without undue occupation of the line so that the utilization factor of the line can be improved. Moreover, it is not necessary to modify in any way the existing line for installing the telephone apparatus of this invention.

While the invention has been shown and described in terms of a preferred embodiment thereof it will be understood that the invention is by no means limited to the particular embodiment and that many changes and modifications will be obvious to one skilled in the art without departing from the true spirit and scope of the invention.

What is claimed is:

1. Telephone apparatus located at a called party station comprising a telephone set, terminal apparatus associated therewith, a response device and a control device;

said response device having a recording tape including a first block in which the dial number of the called party, the dial number of the terminal apparatus and information regarding thereto are recorded, and a second block in which information representing the absence of the called party is recorded; and said control device includes means responsive to a ringing signal from a central office for operating said response device so that the information from said first block is transmitted to the calling party and, thereafter, in response to a subsequent dial signal from the calling party the telephone set or the terminal apparatus is seized.

2. The telephone apparatus according to claim 1 wherein said control device also operates said response device to transmit the information recorded in said second block to the calling party and thereafter interrupts the telephone line to the called party when the telephone set of the called party does not respond to said subsequent dial signal within a predetermined interval.

3. The telephone apparatus according to claim 1 wherein means is provided which, when said calling party transmits said subsequent signal before completion of the transmission of said information reproduced in said first block, stops the transmission of said information recorded in said first block from said response device and returns said response device to its original state.

4. The telephone apparatus according to claim 1 wherein means is provided which, when said operated response device is not yet returned to the original state at the end of the communication between said called and calling parties, operates to seize the telephone line to said called party until said original state is restored.

5. The telephone apparatus according to claim 1 wherein means is provided which, when the calling party inadvertently transmits a subsequent dial signal which is impermissible, operates to send back a signal to said calling party informing him of his misoperation and returns said response device to its original state.

6. The telephone apparatus according to claim 1 wherein, when said calling party abandons his call after initiating said subsequent dial signal and at a predetermined interval after an initial signal occurs, said response device restores to its original state.

7. The telephone apparatus according to claim 1 wherein said terminal apparatus is seized in response to a selected said subsequent dial signal, including means for sending a confirmation signal to said calling party indicating connection to said terminal apparatus and supervisory device means for monitoring the presence of signals on said line and releasing said line upon detecting the absence of signal for a predetermined interval.

* * * * *

UNITED STATES PATENT OFFICE

CERTIFICATE OF CORRECTION

Patent No. 3,798,380 Dated March 19, 1974

Inventor(s) Yoshimitu Hoshi, Takeshi Wakabayashi and Saburo Uchida

It is certified that error appears in the above-identified patent and that said Letters Patent are hereby corrected as shown below:

Column 1, line 8, after "telephone" insert -- circuit --;
line 26, delete "on-hook" and insert -- hooked-on --;
line 42, delete "step" and insert -- block --.

Column 2, line 17, delete "redialling" and insert -- dialing --;
line 25, delete "on-hook" and insert -- hook-on --;
line 58, delete "on-hooked" and insert -- hooked-on --.

Column 5, line 1, delete "$f_3$" and insert -- $F_3$ --;
line 11, delete "b'" and insert -- $\bar{b}'$ --;
line 13, delete "$\frac{-}{b'}$" and insert -- b' --.

Column 8, line 52, delete "$F_1$" and insert -- $f_1$ --.

Column 10, line 26, delete "e'" and insert -- $\bar{e}'$ --;
line 40, delete "e'" and insert -- $\bar{e}'$ --.

Column 11, line 58, delete "taking" and insert -- talking --;
line 61, delete "gete" and insert -- gate --.

Column 13, line 40, "t, + $t_2$" should be -- $t_1 + t_2$ --.

Column 14, line 16, before "through" insert -- set --.

line 46, "$_1$" should be -- $\bar{Z}_1$ --;
line 48, "$_1$" should be -- $Z_1$ --;
line 50, "$_1$" should be -- $Z_1$ --.

Signed and sealed this 8th day of April 1975.

(SEAL)
Attest:

RUTH C. MASON
Attesting Officer

C. MARSHALL DANN
Commissioner of Patents
and Trademarks

FORM PO-1050 (10-69) USCOMM-DC 60376-P69